United States Patent [19]

Moore, III

[11] Patent Number: 4,538,335

[45] Date of Patent: Sep. 3, 1985

[54] EMBROIDERY FRAME PRESS

[76] Inventor: Edgar F. Moore, III, 4447 Old Randleman Rd., Greensboro, N.C. 27405

[21] Appl. No.: 626,530

[22] Filed: Jun. 29, 1984

[51] Int. Cl.3 ............................................ B23P 19/02

[52] U.S. Cl. ..................................................... 29/251

[58] Field of Search ............. 144/288 R, 285; 408/95, 408/98; 29/244, 251, 252, 255, 263, 280, 267, 281.1, 281.3, 282, 283; 100/295

[56] References Cited

U.S. PATENT DOCUMENTS

| | | | |
|---|---|---|---|
| 854,304 | 5/1907 | Oskamp | 408/98 |
| 2,775,025 | 12/1956 | Williams | 29/280 |
| 2,807,081 | 9/1957 | Black | 29/252 R |
| 2,971,253 | 2/1961 | Berglund | 29/251 |
| 3,256,761 | 6/1966 | Huntley | 408/98 |
| 3,367,016 | 2/1968 | Sainz | 29/280 |
| 3,447,454 | 6/1969 | Ratz | 29/251 |
| 3,816,899 | 6/1974 | Kitts | 29/263 |
| 3,945,104 | 3/1976 | Brookover | 29/255 |
| 4,050,136 | 9/1977 | Shultz | 29/263 |
| 4,265,283 | 5/1981 | Nash et al. | 144/286 R |

FOREIGN PATENT DOCUMENTS

| | | | |
|---|---|---|---|
| 363213 | 7/1962 | Switzerland | 269/48.1 |

*Primary Examiner*—Robert C. Watson

[57] ABSTRACT

An embroidery frame press is provided having a plunger which is operated by a foot pedal for forming frames of cloth or other material for embroidering, stitching or other work. An inner frame is spring mounted on the plunger head which is directed to a base frame support having a base frame positioned therein for which a textile article is placed for embroidering or other work. The plunger forces the inner frame and cloth or other material into the outer frame after which the plunger is withdrawn and a frame of cloth or other material is thereby provided for embroidering or other work.

4 Claims, 8 Drawing Figures

EMBROIDERY FRAME PRESS

BACKGROUND OF THE INVENTION

1. Field Of The Invention

This invention relates to a press for use in conjunction with embroidery machines or the like whereby the cloth or other materials prior to stitching or embroidering is positioned under tension in a conventional embroidery frame in a fast, efficient manner which insures uniform tension of the cloth or other materials within the frame regardless of the thickness or cloth or other material construction.

2. Description Of The Prior Art And Objectives Of The Invention

It is common to embroider names, trademarks or designs on shirts, hats, jackets and other apparel as well as other articles and in recent years such personalized items have been increasing in demand. Prior to embroidering, a shirt or other textile article is conventionally placed in an embroidery frame comprising of inner and outer cylindrically or other shaped rings which are manually forced together (assembled) with the cloth or other materials therebetween under tension. The embroidery frame thus provides a flat, circular or other shaped area for embroidering from which the frame is removed after the embroidery operation is completed.

It is not uncommon for the embroidery frame to comprise a pair of cylindrically or other shaped frames formed from plastic or other materials which may become distorted after continuous use and be difficult to manually assemble. Also, as the thickness of various types of fabrics differs it is oftentimes impossible for the user to manually assemble the frame since sufficient hand pressure cannot be applied. Additionally, certain fabrics have a stiff or "boardy" hand and even though they are of a relatively thin thickness they are difficult if not impossible to manually frame.

With the disadvantages and knowledge of manually framing cloth for embroidering the present invention was conceived and one of its objectives is to provide a simple, economical embroidery frame press which can be utilized with a minimum of strength and effort;

It is another objective of the present invention to provide an embroidery frame press which will provide a frame of cloth or other materials having uniform tension throughout;

It is still another objective of the present invention to provide an embroidery frame press having suitable counter space for convenience and ease in operation;

It is yet another objective of the present invention to provide an embroidery frame press having a plunger head which can be quickly changed to adapt to various frame sizes and configurations.

Other objectives and advantages of the present invention will become apparent to those skilled in the art as the invention herein is set forth below in greater detail.

SUMMARY OF THE INVENTION

The aforesaid and other objectives of the invention are accomplished by utilizing a frame press having a foot actuator pedal connected to a plunger lever which is joined to a plunger having a disk-shaped head. The plunger includes a head configured to engage a particular frame size and shape and said head can be quickly changed to accommodate various frame sizes. The disk-shaped head is sized to compress the inner and outer embroidery frames having cloth or other materials therebetween in a fast and efficient manner to thereby form a frame of cloth or other materials having uniform tension throughout for embroidering or stitching. The embroidery frame press can be positioned within a cabinet having sufficient counter dimensions for convenience in positioning additional frames and cloth or other materials so that an operator can prepare multiple frames of cloth for embroidering in a matter of minutes. The cabinet also has sufficient storage space to maintain the press operators tools and extra frame plunger heads as required.

DESCRIPTION OF THE PREFERRED EMBODIMENT

Figure 2:
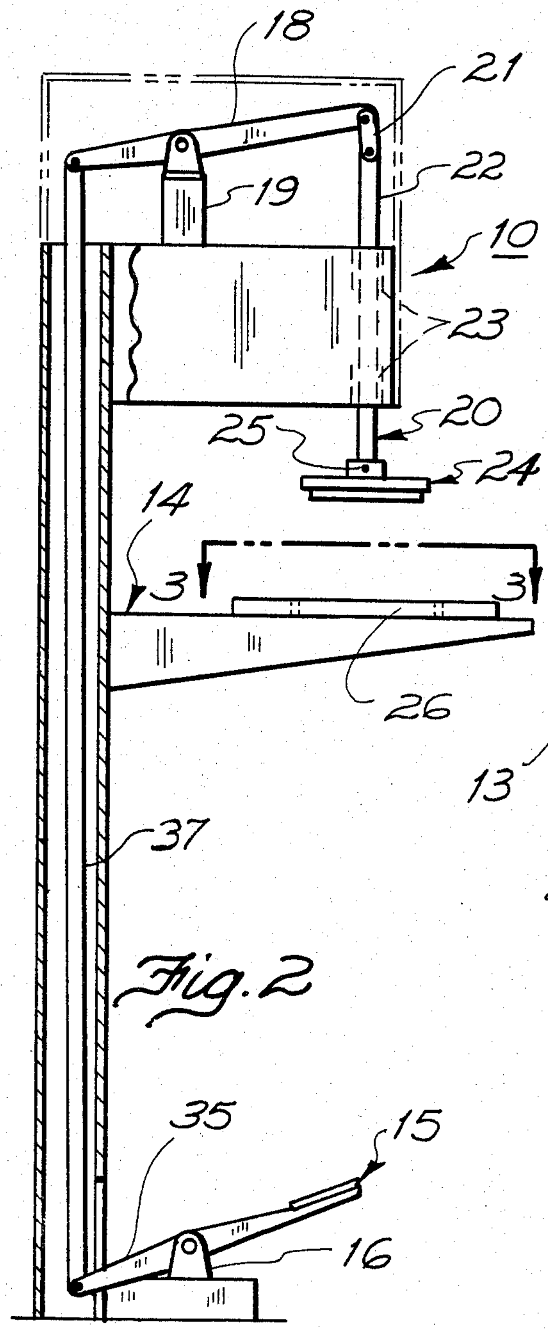
FIG. 2 demonstrates a cut-away side elevational view of the invention as shown in FIG. 1 to illustrate the frame press.
Figure 4:
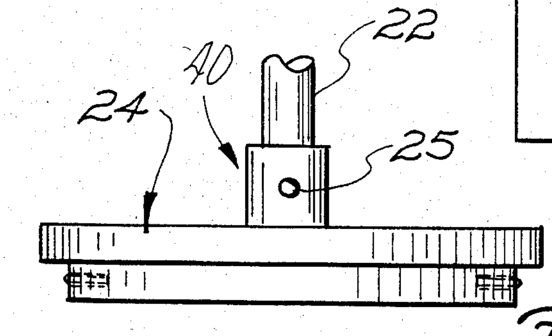
FIG. 4 demonstrates an enlarged view of one embodiment of the plunger head.
Figure 5:
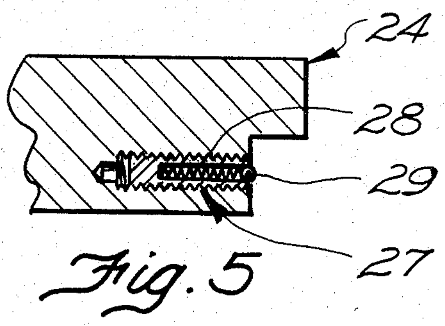
FIG. 5 shows a cross sectional view of the tension member of the plunger head.
Figure 8:
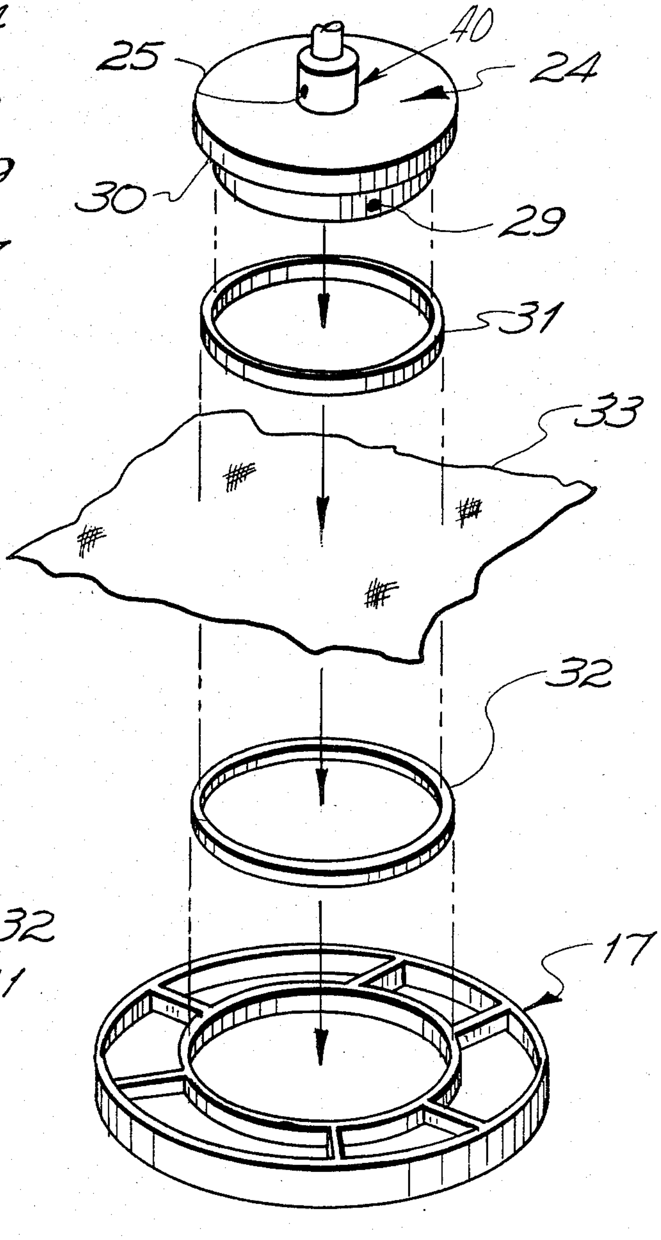
FIG. 8 demonstrates an exploded view of the plunger head, inner frame, cloth or other material, an outer frame and base frame.

The preferred embodiment of the embroidery frame press is shown in FIG. 2 comprising an actuator means consisting of a foot actuator pedal pivotally mounted on an actuator support, and a pedal or connector shaft extending vertically from the foot actuator pedal to a plunger lever which is joined to a fulcrum. The foot actuator pedal is located below the cabinet counter upon which the cloth or other materials framing takes place. The plunger lever is joined by a connector to a plunger shaft to which the plunger head is releasably joined. Plunger shaft guides are positioned to insure a precise directional stroke of the plunger head which must accurately contact the lower base frame. The plunger head as seen in FIG. 4 has a securing means for rapidly changing or removing the plunger head. The plunger head, as shown in FIG. 5 includes a tension member which grips the inner embroidery frame during the press operation. The base frame as shown in FIG. 8 is mounted flush within a base frame support which is secured to the counter top of the press cabinet.

DETAILED DESCRIPTION OF THE DRAWINGS

Figure 1:
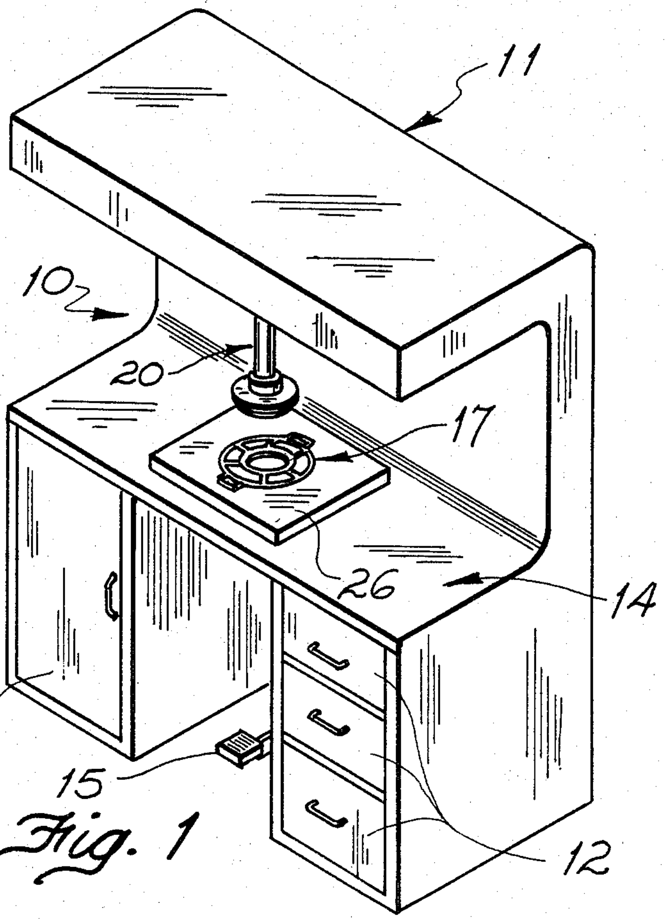
FIG. 1 is a perspective view of the embroidery frame press of the invention.

For a complete understanding of the operation of the embroidery frame press as shown herein, FIG. 1 demonstrates a typical arrangement of embroidery frame press 10 housed within cabinet 11 having storage space within drawers 12 and behind door 13. Counter 14 provides convenient work space for the press operator. Foot actuator pedal 15 when depressed drives plunger 20 towards base frame 17 for forming a frame of cloth or other materials for embroidering, stitching or other work to be done using the same or similar procedures.

Figure 3:
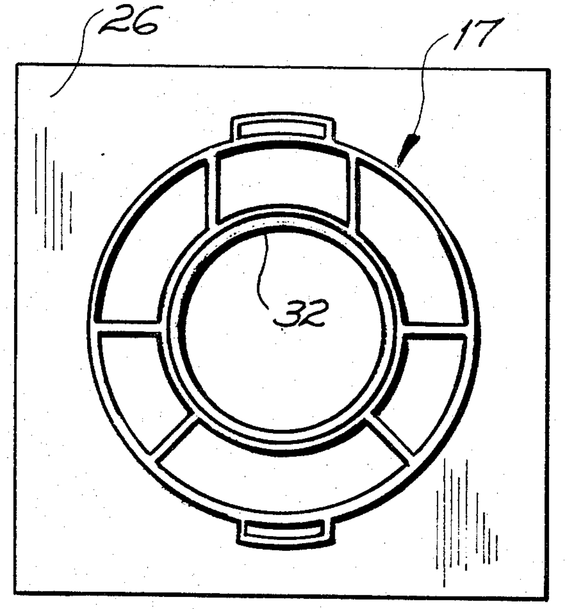
FIG. 3 demonstrates a top view of the base frame support as shown by lines 3—3 in FIG. 2.

As further shown in FIG. 2, foot actuator pedal 15 is joined to actuator support 16 for extending vertical connector 37 which in turn is joined at its upper end to plunger lever 18. Lever 18 is joined to fulcrum 19 whereby lever 18 moves plunger 20 inwardly and downwardly. Plunger 20 is connected to lever 18 by link 21 which is joined to plunger shaft 22 slidably positioned within plunger shaft guides 23. Plunger head 24 may be disk-shaped as shown in FIG. 4 and includes hub 40 for receiving shaft 22. Plunger head 24 is releasably mounted on plunger shaft 22 by shaft securing means 25 which may be for example a conventional setscrew. By depressing actuator pedal 15 plunger head 24 is depressed and will contact base frame 17 as shown enlarged in FIG. 3. Base frame 17 is mounted flush with the top surface of base frame support 26 as shown in FIG. 2.

Figure 6:
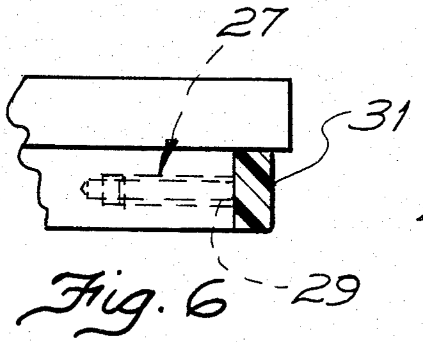
FIG. 6 demonstrates a portion of the plunger head with the inner frame member positioned thereon.
Figure 7:
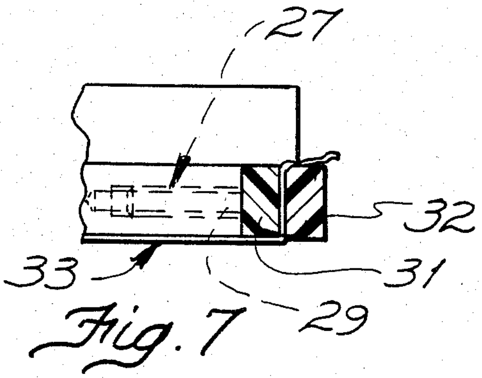
FIG. 7 demonstrates a section of the plunger head with the inner frame, cloth or other materials and outer frame member positioned thereon.

Plunger head 24 may contain one or more tension members 27 as shown in cut away fashion in FIG. 5. Tension member 27 includes a coil spring 28 and tension ball 29. As further shown in FIG. 5, plunger head 24 includes flange 30 which contacts inner embroidery frame 31 and outer embroidery frame 32 shown in FIGS. 6 and 7. Cloth or other materials 33 is sandwiched between inner frame 31 and outer frame 32 and is maintained under constant, uniform tension for embroidering, stitching or other work. An exploded view of the frame assembly is shown in FIG. 8 whereby plunger head 24 first contacts inner frame 31 and sandwiches cloth 33 within outer frame 32 as plunger head 24 moves within base frame 17. Accordingly, a circular frame of cloth is thereby provided which is uniform in tension and requiring little manual effort but not dependent on the hand strength of the operator.

The operator of embroidery frame press 10 as shown in FIG. 1 will place outer frame 32 within base frame 17 and will hold each side of cloth or other material 33 thereover after positioning inner embroidery frame 31 on disk-shaped plunger head 24. With cloth or other material 33 so held with both hands to properly center the material the operator then depresses foot actuator pedal 15 whereupon actuator means 35 which includes foot actuator pedal 15, vertical connector 37 and plunger lever 18 then forces plunger 20 in a downward direction causing inner frame 31 to sandwich cloth or other material 33 within outer frame 32. As foot actuator pedal 15 is released plunger 20 returns to its upward or open position releasing and withdrawing from inner frame 31. The operator can then lift the frame of cloth or other material from frame press 10 which can be transported to an embroidery machine for further work and frame disassembly as required. The invention as shown herein is operated by manually depressing foot actuator pedal 15 but hydraulic, pneumatic or electrical actuating means can be used if desired. The illustrations and examples presented herein are for illustrative purposes and are not intended to limit the scope of the invention.

I claim:

1. An embroidery framing device comprising: a plunger head, a shaft receiving hub, said hub joined to said plunger head, shaft securing means, said shaft securing means positioned on said hub for securing a shaft in said hub, said hub having a smaller diameter than said plunger head, said plunger head including a flange, a tension member, said tension member radially mounted in said plunger head, said tension member including a coil spring and tension ball whereby said plunger head will releasably engage an inner embroidery frame for pressing into an outer embroidery frame.

2. An embroidery framing device as claimed in claim 1 wherein said plunger head is disk-shaped.

3. An embroidery frame press comprising: a cabinet, said cabinet having a counter, a base frame support, said base frame support mounted on said counter, a plunger, said plunger positioned over said counter, said plunger including a plunger head, said plunger head having:

(a) a shaft receiving hub with shaft securing means;

(b) a radially mounted tension member, said tension member including a coil spring and a tension ball for releasably engaging an inner embroidery frame; and (c) a flange member, actuator means, said actuator means joined to said plunger, said actuator means for directing said plunger head to said base frame, whereby said plunger head will press an inner embroidery frame into an outer embroidery frame positioned in said base frame.

4. An embroidery frame press as claimed in claim 3 wherein said plunger head is disk-shaped.

* * * * *